(12) United States Patent
Barsness et al.

(10) Patent No.: US 8,122,010 B2
(45) Date of Patent: Feb. 21, 2012

(54) DYNAMIC QUERY OPTIMIZATION

(75) Inventors: Eric Lawrence Barsness, Pine Island, MN (US); Mahdad Majd, Rochester, MN (US); Randy William Ruhlow, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/930,765

(22) Filed: Oct. 31, 2007

(65) Prior Publication Data

US 2008/0052720 A1    Feb. 28, 2008

Related U.S. Application Data

(62) Division of application No. 10/787,639, filed on Feb. 26, 2004.

(51) Int. Cl.
*G06F 7/00* (2006.01)
*G06F 17/30* (2006.01)

(52) U.S. Cl. .................. 707/718; 707/719; 707/720

(58) Field of Classification Search ............. 707/718, 707/719, 720, 999.002, 999.003, 999.004, 707/999.005
See application file for complete search history.

(56) References Cited

U.S. PATENT DOCUMENTS

| | | | |
|---|---|---|---|
| 5,093,794 A | 3/1992 | Howie et al. | |
| 5,301,317 A | 4/1994 | Lohman et al. | |
| 5,325,525 A * | 6/1994 | Shan et al. | 718/104 |
| 5,465,354 A | 11/1995 | Hirosawa et al. | |
| 5,659,786 A | 8/1997 | George et al. | |
| 5,784,616 A | 7/1998 | Horvitz | |
| 5,872,970 A | 2/1999 | Pickett et al. | |
| 5,918,229 A | 6/1999 | Davis et al. | |
| 6,041,354 A | 3/2000 | Biliris et al. | |
| 6,101,460 A | 8/2000 | Brinkerhoff et al. | |
| 6,260,068 B1 | 7/2001 | Zalewski et al. | |
| 6,314,446 B1 | 11/2001 | Stiles | |
| 6,321,373 B1 | 11/2001 | Ekanadham et al. | |
| 6,339,773 B1 | 1/2002 | Rishe | |
| 6,353,818 B1 * | 3/2002 | Carino, Jr. | 1/1 |
| 6,353,844 B1 | 3/2002 | Bitar et al. | |
| 6,779,016 B1 * | 8/2004 | Aziz et al. | 709/201 |
| 6,789,074 B1 | 9/2004 | Hara et al. | |
| 6,952,828 B2 | 10/2005 | Greene | |
| 7,065,764 B1 | 6/2006 | Prael et al. | |
| 7,185,333 B1 | 2/2007 | Shafron | |

(Continued)

FOREIGN PATENT DOCUMENTS

JP   2000163307 A   6/2000

(Continued)

OTHER PUBLICATIONS

K Inayama et al., "Realizing Autonomic Computing with Tivoli(R)," Provision, IBM Japan Systems Engineering Co., Ltd, vol. 11, No. 1, pp. 36-42 (English abstract included).

(Continued)

*Primary Examiner* — Mohammad Ali
*Assistant Examiner* — Patrick Darno
(74) *Attorney, Agent, or Firm* — Roy W. Truelson

(57) ABSTRACT

Methods, systems, and computer program products for dynamically adjusting computer resources, as appropriate, in response to predictions of query runtimes as well as for rendering costs of the computer resources actually utilized, which costs are consistent with consumer demands.

18 Claims, 8 Drawing Sheets

U.S. PATENT DOCUMENTS

| | | | |
|---|---|---|---|
| 7,188,174 | B2 | 3/2007 | Rolia et al. |
| 7,308,687 | B2 | 12/2007 | Trossman et al. |
| 7,325,234 | B2 | 1/2008 | Smith |
| 7,448,037 | B2 | 11/2008 | Arimilli et al. |
| 2003/0065648 | A1 | 4/2003 | Driesch, Jr. et al. |
| 2004/0030677 | A1 | 2/2004 | Young-Lai |
| 2004/0139202 | A1 | 7/2004 | Talwar et al. |
| 2005/0015504 | A1 | 1/2005 | Dorne et al. |
| 2005/0022185 | A1 | 1/2005 | Romero |
| 2005/0055446 | A1* | 3/2005 | Chidambaran et al. ....... 709/226 |
| 2005/0076337 | A1 | 4/2005 | Mangan |
| 2005/0177557 | A1* | 8/2005 | Ziauddin et al. .................. 707/3 |
| 2005/0187935 | A1* | 8/2005 | Kumar ............................... 707/9 |
| 2008/0086731 | A1 | 4/2008 | Trossman et al. |

FOREIGN PATENT DOCUMENTS

| | | |
|---|---|---|
| JP | 2002202959 A | 7/2002 |
| WO | 03/052590 A1 | 6/2003 |

OTHER PUBLICATIONS

K. Appleby et al., "Oceano—SLA Based Management of a Computing Utility," Proceedings of IEEE International Symposium on Integrated Network Management, 2001, pp. 855-868.

Ken-Ichi Chinen et al., "A Dynamic Site Formation Mechanism for Synchronized Publication Type WWW Server Farm," IPSJ Journal, Information Processing Society of Japan, vol. 45, No. 1, Jan. 15, 2011, pp. 56-64.

R Buyya, "Economic-Based Distributed Resource Management and Scheduling for Grid Computing", Monash University, Thesis Document, Apr. 2002.

N. Sample et al., "Scheduling Under Uncertainty: Planning for the Ubiquitous Grid", Computer Science Department of Stanford University, 2002.

J. Basney, "Network and CPU Co-Allocation in High Throughput Computing Environments", Dissertation Submitted to University of Wisconsin-Madison, 2001.

J. Chase et al., "Managing Energy and Server Resources in Hosting Centers", Duke University, 2002.

P. Bose et al., Performance Analysis and its Impact on Design, IEEE May 1998, pp. 41-49.

R. Wolski, "Experiences with Predicting Resource performance On-Line in Computational Grid Settings", ACM Sigmetrics Performance Evaluation Review, vol. 30, Issue 4, Mar. 2003, pp. 41-49.

J. Chase et al., "Dynamic Virtual Clusters in a Grid Site Manager", Proceedings of the 12th IEEE International Symposium on High Performance Distributed Computing, 2003.

R. Moreno, "Job Scheduling and Resource Management Techniques in Dynamic Grid Environments", Madrid University, 2002.

* cited by examiner

DYNAMIC QUERY OPTIMIZATION

CROSS REFERENCE TO RELATED APPLICATIONS

This is a divisional application of U.S. patent application Ser. No. 10/787,639, filed Feb. 26, 2004, entitled "Dynamic Query Optimization", which is herein incorporated by reference. This application claims priority under 35 U.S.C. §120 of U.S. patent application Ser. No. 10/787,639, filed Feb. 26, 2004. The present application is also related to commonly owned U.S. patent application Ser. No. 10/787,722, filed Feb. 26, 2004, which is herein incorporated by reference.

BACKGROUND OF THE INVENTION

The present invention relates generally to computer-implemented data processing methods, systems, and computer program products. More particularly, it relates to dynamically optimizing database queries, as appropriate, so that query runtimes complete within query governing time boundaries.

In typical database querying using SQL, query governors are mechanisms that perform several functions. Typically, query governors may be configured to allow all queries to run a predefined maximum amount of time, for example several seconds for all queries for all connections, or just the queries for a specific connection. One specific query governor function is to preempt or prevent long-running queries from executing before they start. This preemption is based on determinations of whether estimates of query runtime, as made by a query optimizer, will exceed predefined query time boundaries that have been set by the query governor. If a determination is made that the threshold may be exceeded then a warning may be issued and the query does not run. This is beneficial since it prevents system resources from being needlessly consumed.

While query governors manage queries in the foregoing fashion, there are no known approaches for dynamically predicting the appropriate amount of computer resources needed for fitting otherwise long-running queries within predefined query time boundaries so that the queries are not preempted from running. Furthermore, no approaches are known for dynamically allocating the appropriate amount of computer resources to fit the otherwise long-running queries within the predefined query time boundaries wherein the allocations are based on the dynamic predictions. In addition, no approaches are known for use in systems wherein the allocated resources are made available from logically partitioned and/or grid environments for achieving the foregoing tasks. Moreover, no approaches are known for apportioning costs or fees to customers based on computer resources actually utilized to achieve the foregoing, let alone to satisfy the configurable costs and performance demands of customers.

Accordingly there are needs for methods, systems, and computer program products for the benefit of providing query governors that: manage data by preventing long-running queries from executing; dynamically predict the appropriate amount of computer resources needed for fitting query runs so as to complete within predefined time boundaries; dynamically allocate the appropriate amount of computer resources for making query runs complete within the predefined query time boundaries based on such dynamic predictions; are applicable in logically partitioned and/or grid environments for apportioning resources; and, apportion costs to customers based on actually utilized computer resources, whereby configurable demands of customers are satisfied.

Accordingly, without such needs being satisfied, the true potential of running queries with query governors will not be easily achieved.

SUMMARY OF THE INVENTION

The present invention provides improvements in methods, systems, and computer program products for dynamically predicting an appropriate amount of computer resources that should be allocated to have queries complete within predefined query time boundaries which queries would not otherwise complete within such boundaries. Included are improvements for dynamically allocating the appropriate computer resources in accordance with these dynamic predictions without negative effect and that overcome many of the disadvantages of prior art processing arrangements.

The aspects of the present invention include improvements in methods, systems, and computer program products with the advantages of having the dynamically allocated computer resources being derived from logically partitioned and/or grid environments.

The aspects of the present invention include improvements in methods, systems, and computer program products with the advantages of apportioning costs to customers based on actually utilized computer resources whereby configurable demands of customers as to costs and performance are satisfied.

Still another aspect of the present invention is that it provides for a reliable and efficient manner for query optimization.

These and other features and aspects of the present invention will be more fully understood from the following detailed description of the exemplary embodiments, which should be read in light of the accompanying drawings. It should be understood that both the foregoing generalized description and the following detailed description are exemplary, and are not restrictive of the invention.

DETAILED DESCRIPTION OF THE PREFERRED EMBODIMENTS

The present invention is generally directed to systems, methods, and computer program products for dynamically predicting and allocating computer resources, as appropriate, for completing queries within predefined query time boundaries which queries would have been preempted from running because they were predicted to complete outside the predefined query time boundaries. Optimization may involve the dynamic allocation of computer resources from, stand-alone computer systems, and/or grid computing, and/or logically partitioned processor environments. As such, system users would be fairly charged for computer resources actually utilized, but not for unneeded resources.

Figure 1:
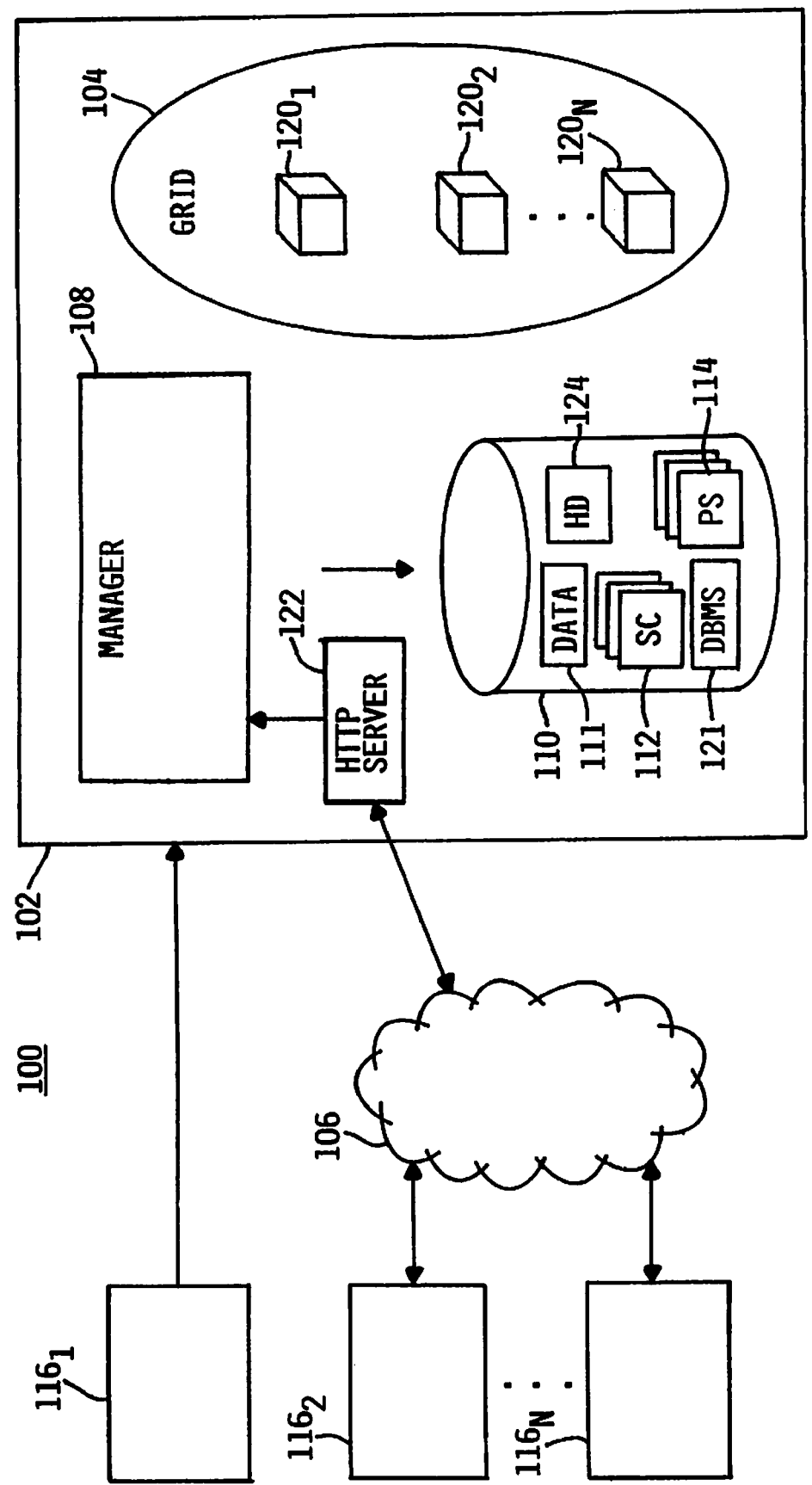
FIG. 1 is a block diagram of an environment having a provider of computing services through a grid environment, in accordance with the present invention.
Figure 2:
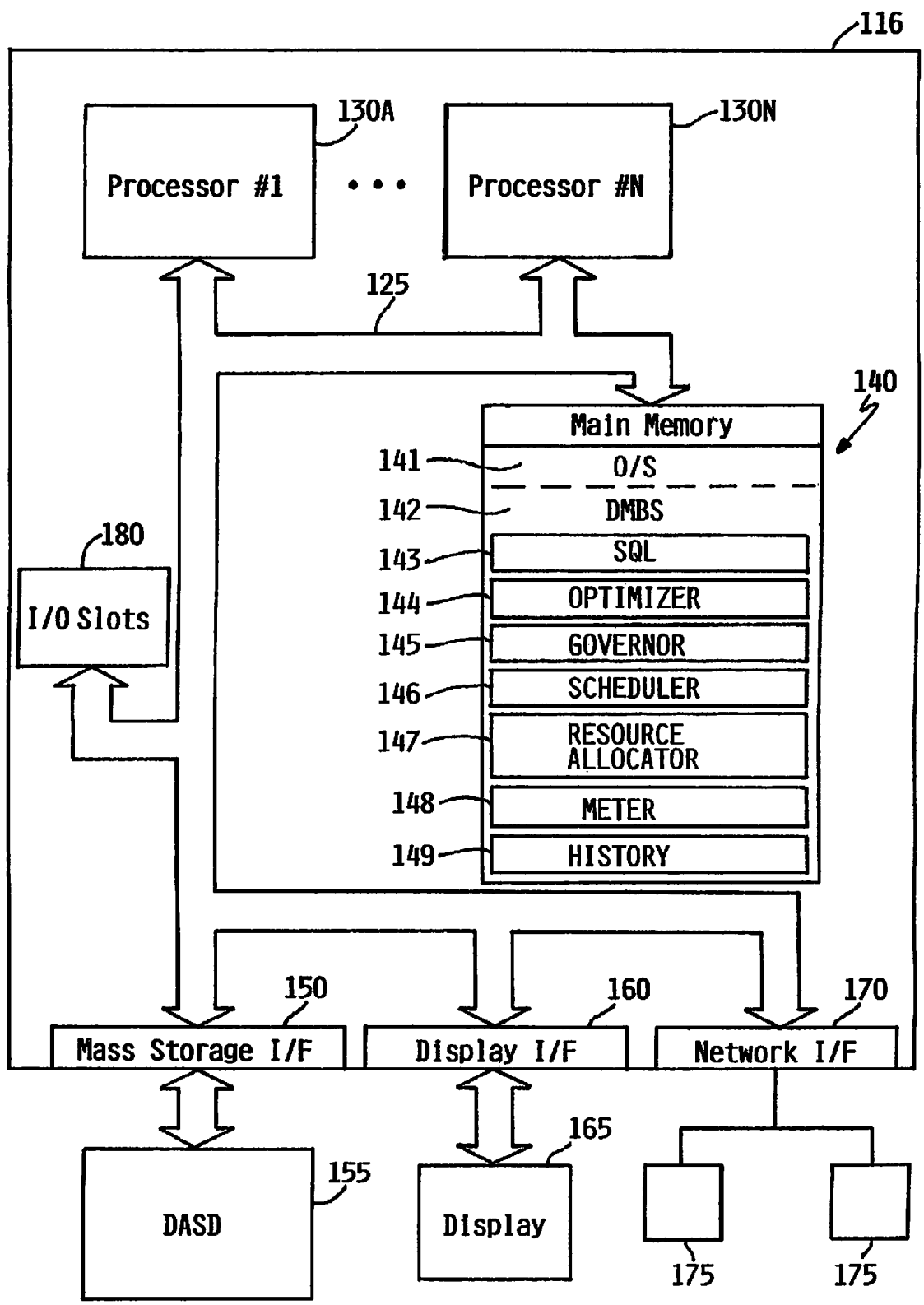
FIG. 2 is a block diagram of a computer system in accordance with one of the exemplary embodiments.
Figure 3:
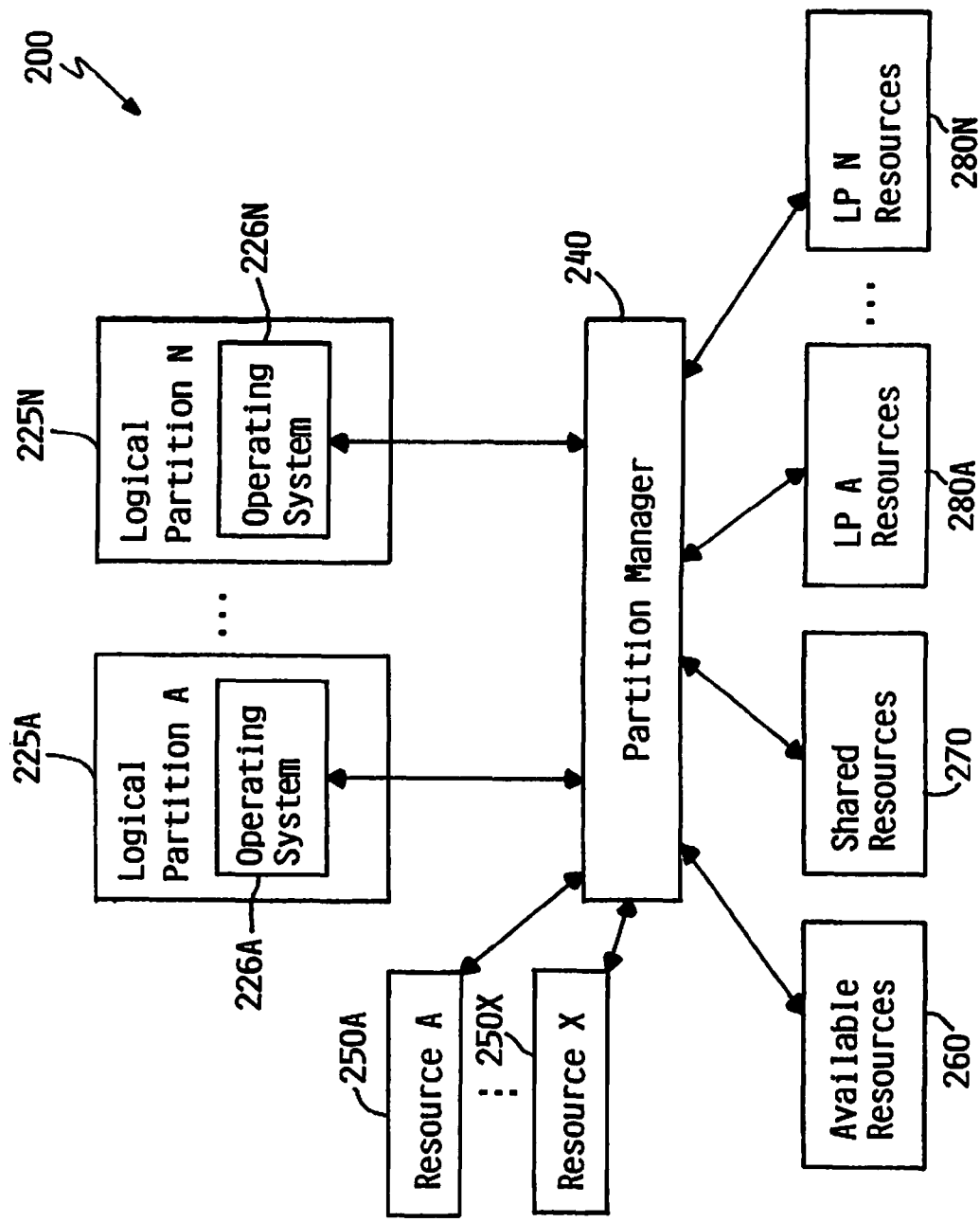
FIG. 3 is a block diagram illustrating logical components in a logically partitioned computer system.

FIGS. 1-3 illustrate one exemplary embodiment of a data processing system 100 for implementing query optimization methods in accordance with the present invention. The illustrated embodiment is but one example of a wide variety of systems that may be utilized. Referring now to FIG. 1, a data processing environment 100 is shown in which the present invention is practiced. Generally, the data processing environment 100 includes a provider computer system 102 and a plurality of one or more computer systems $116_1$-$116_N$ (collectively 116). The provider computer system 102 is illustratively embodied as a server computer with respect to the system users (client) computer systems 116. Although all computers are illustrated as singular entities, in practice the provider computer system 102 and the client computer systems 116 may all be a network of computer systems configured to perform various functions, including those described herein. Further, the terms "client" and "server" are utilized herein merely for convenience and not by way of limitation. As such, the client computer system 116, which may be clients relative to the provider computer system 102 in some regards, may themselves be servers relative to one or more other clients (not shown).

The provider computer system 102 and the client computer systems 116 communicate through a network 106. The provider computer system 102 provides access to a grid computing environment 104. Access to various resources within the grid computing environment 104 may also be provided by different service providers. The grid environment 104 may contain a plurality of different computing resources $120_1$-$120_N$ (collectively 120). The grid-computing environment 104 may include parallel and distributed computing systems that enable sharing, selection, and aggregation of geographically distributed resources at runtime depending on their availability, capability, performance, cost, and/or user's quality of service requirements. The grid computing environment 104 may be a network including diverse hardware and/or software computing resources. These resources may be available and accessible through a network medium 106, such as the Internet, to a wide variety of users and may be shared between them.

In the exemplary embodiment, the network 106 may be any one of several suitable through which information may be transferred, such as, a local area network (LAN) or a wide area network (WAN). The provider computer system 102 may be configured with a hypertext transfer protocol (HTTP) server 122 for servicing requests from browser programs residing on the client computer systems 116. The HTTP server 122 and the browser programs provide convenient and well-known software components for establishing a network connection (e.g., a TCP/IP connection) via the network 106.

Referring back to the provider computer system 102, it may be configured with a manager 108 that requests grid resources for the client computer systems 116. In an exemplary embodiment, the manager 108 manages routing requests from the client computer systems 116 to the appropriate resources of the grid environment 104. Such a grid computing system is described in copending and commonly assigned patent application Serial No Ser. No. 10/659,976 filed on May 2, 2003, and is incorporated herein and made a part hereof. Only those details considered necessary for implementing the present invention will be presented.

Some of the requests for grid resources are fulfilled on a fixed fee bases or fee bases dependent on parameter values. For example, fees are charged dependant on the time needed to process a query. The manager 108 also monitors progress of these requests by keeping track of time spent on a particular request and calculating costs associated therewith. Although, the manager 108 is shown as a single entity, it should be noted that it may be representative of different functions implemented by different software and/or hardware components within the provider computer system 102. The pricing is determined with respect to any variety of pricing criteria including, for example, time-based criteria, request-type or class criteria, priority criteria, historical information, system user identification criteria, and combinations thereof. These pricing criteria are applied to define pricing schedules or policies that the manager 108 may access to calculate a cost for a request. In one embodiment, pricing criteria is defined in service contracts 112 stored in a database 110. The database 110 is a relational database. The database 110 may utilize a database management system (DBMS), such as in DB2, that is commercially available from International Business Machines Corporation, Armonk, N.Y. for use with data files 111. The database 110 may also contain historical data 124 that include a log of requests received and processed in the past, with the corresponding amount of resources utilized and the time taken to process various aspects of the queries. A service contract may exist for each contractual system user of the provider computer system 102. In another embodiment, pricing criteria may be specified in generic pricing schedules 114 for system users who do not have contractual agreements with the service provider. Different generic pricing schedules 114 may exist for a variety of different pricing criteria including those mentioned above (e.g., request-time criteria, request-type or class criteria, priority criteria, historical information, system user identification criteria, and combinations thereof).

Historical information may also serve as criteria for determining a pricing schedule. Pricing schedules may exist that take account of a combination of the one or more pricing criteria. The historical information may be supplied by the historical data 124 which includes information about the amount of resources and time taken to process a request in the past. The historical data 124 may be searched to determine whether a similar or same request as the request received has been processed in the past. If a similar request is located in the historical data, the information about resources utilized and time taken to process the request may be utilized to select a different pricing schedule. Of course, each of the criteria mentioned above are optional, and may or may not be utilized in determining pricing schedules, in different embodiments.

Reference is made to FIG. 2 for illustrating a computer system 116, such as an eServer iSeries computer system commercially available from International Business Machines Corporation, Armonk, N.Y. It will be appreciated that other computer systems are envisioned for use in implementing the present invention and that the illustrated embodiment is exemplary of but one. The computer system 116 comprises one or more processors $130_{A-N}$ (collectively 130) that are connected to a main memory 140, a mass storage interface 150, a display interface 160, a network interface 170, and a plurality of I/O slots 180. A system bus 125 interconnects these components. Although only a single bus is utilized, those skilled in the art will appreciate that the present invention may utilize multiple buses. Each one of the processors may be constructed from one or more microprocessors and/or integrated circuits. The processors execute program instructions in the main memory. The mass storage interface 150 is utilized to connect to mass storage devices, such as a direct access storage device (DASD) 155, for example a suitable CD RW drive, to a computer system. The display interface 160 is utilized to directly connect one or more displays 165 to the computer system. The displays 165 may be non-intelligent terminals or fully programmable workstations. The network interface 170 is utilized to connect other computer systems and/or workstations 175 to computer system 116 across a network. It is pointed out that the present invention applies no matter how many computer systems and/or workstations may be connected to other computer systems and/or workstations, regardless of the network connection technology that is utilized.

The main memory 140 contains the data that may be read or written by any processor 130 or any other device that may access the main memory. The main memory 140 may include an operating system 141. The main memory 140 stores programs and data that the processor may access and execute. The operating system 141 is a multitasking operating system, such as OS/400™, AIX™, or Linux™. Those skilled in the art will appreciate that the spirit and scope of the present invention is not limited to any one operating system. The operating system 141 manages the resources of the computer system including the processor 130, main memory 140, mass storage interface 150, display interface 160, network interface 170, and I/O slots 180. Any suitable operating system may be utilized. The operating system 141 includes applications for operating the system. Included in the main memory 140 is the database management system (DBMS) 142. The database management system 142 is an application for storing data into, retrieving data from, and modifying data stored in the database 110 using a high-level query language, such as Standard Query Language (SQL). A system user may utilize queries involving SQL commands in an interactive SQL program 143. The queries operate to retrieve data and display it. Also, included in the database management system 142 is a query optimizer 144, a query governor 145, and, a query scheduling manager 146. The query scheduling manager 146 manages the operation of the query governor 145 in a manner to be described so as to effect dynamic predicting of computer resources needed to have queries executed within the predefined time. The query scheduling manager 146 also includes a computer resource allocator application or module 147, an actual computer resources meter application or module 148, and a query history mechanism or module 149 as will be described. The resource allocator module 147 apportions the computer resources from the stand-alone, logical partitioned and grid environments, as appropriate, that are based on the predictions for completing query runtimes within the predefined query time boundaries that are set by the query governor. The actual usage metering module 148 is provided for use in determining costs based on actual utilization of computer resources. A query history module 149 is provided which creates history tables for new jobs and which updates history tables for known queries. The data base management system, the SQL application, the query optimizer, query scheduling manager, the query governor, the resource allocator, the actual usage meter, and the query history module may reside in the main memory, but, as is known, may reside elsewhere.

The query optimizer 144 is an application that operates to select an efficient executable query plan for executing SQL queries applied to a database. A query plan is a method of executing a query. A query is a set of commands for retrieving data from a database. For example, a query plan may produce a requested result in which a query is run in the shortest period of time. The query optimizer 144 also enables predictions of running time periods in which the queries will execute, as well as indicates the hardware resources to be utilized for accomplishing the task. The query governor 145 is an application that receives from the query optimizer 144 predicted values as to how long a query is expected to run in order to complete. The query governor 145 acts to disallow the running of a query should the query have a predicted running length exceeding a set time frame or predefined query time boundaries value of the query governor. The predefined query time boundaries of the query governor may be set to a minimum threshold value and a maximum time limit value. The minimum threshold time value (e.g., secs.) is determined to be a value which if the query exceeds, will cause the query governor to prevent the query from running. The maximum time limit value is a maximum value of time (e.g., secs.) which if the predicted query runtime exceeds, will cause the query governor to prevent the query from running. The predefined query time boundaries boundary values or time settings of the query governor 145 may be established by system user or system configurations.

In accordance with the present invention, the query scheduling manager 146 dynamically predicts an appropriate amount of computer resources for fitting or completing the predicted query runtime within the predefined query time boundaries set by the query governor based on the predicted query running time from the query optimizer 144. This dynamic prediction takes into account available resources from the stand-alone, or from logically partitioned and/or grid computing environments. Thereafter, the query scheduling manager 146 dynamically allocates/de-allocates. through the computer resources allocator module 147, the appropriate resources to have the query runtime fit or complete within the predefined query time boundaries set by the query governor. As a result, queries are allowed to execute which would otherwise be preempted from running because their predicted running time would have exceeded the predefined query time boundaries of the query governor. Also, costs may be apportioned to customers based on actually utilized computer resources, including having the configurable demands of customers being satisfied, to accomplish the task.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type or class of computer readable signal bearing media utilized to actually carry out the distribution. The exemplary embodiments also extend to a logically partitioned computer system and/or a grid environment.

In this regard, reference is made to copending U.S. patent application Ser. No. 10/616,676 filed Jul. 10, 2003, which is commonly assigned. However, only those aspects thereof which relate to understanding the present invention will be set forth. The logical partitions may provide completely different computing environments on the same physical computer system.

Referring to FIG. 3, one specific implementation of a logically partitioned computer system 200 includes N logical partitions, with each logical partition executing its own respective operating system. In FIG. 3, logical partitions $225_{A-N}$ (collectively 225) are shown executing their respective operating systems $226_{A-N}$ (collectively 226). The operating system 226 in each logical partition may be the same as the operating system in other partitions, or may be a completely different operating system. Thus, one partition may run the OS/400 operating system, while a different partition may run another instance of OS/400, possibly a different release. The operating systems in the logical partitions could even be different from OS/400, provided it is compatible with the hardware. The logical partitions 225 are managed by a partition manager 240. One example of suitable partition manager 240 is known as a "Hypervisor" that is commercially available from International Business Machine Corporation. The partition manager 240 manages resources 250, shown in FIG. 3 as resource 240. As used in the present application, a "resource" may be any hardware or software or combination thereof that may be controlled by partition manager 240. Examples of hardware resources include processors, memory, and hard disk drives. Examples of software resources include a database, internal communications (such as a logical LAN), or applications (such as word processors, e-mail, etc.). The partition manager 240 controls which resources 250 may be allocated by the logical partitions 225. A resource, once made available to the partition manager 240, is categorized as an available resource 260 if it has not yet been assigned to a logical partition, is categorized as a shared resource 270 if multiple logical partitions may access the resource, and is categorized as a dedicated resource $280_{A-N}$ (collectively 280) if it has been exclusively assigned to a logical partition.

Figure 4:
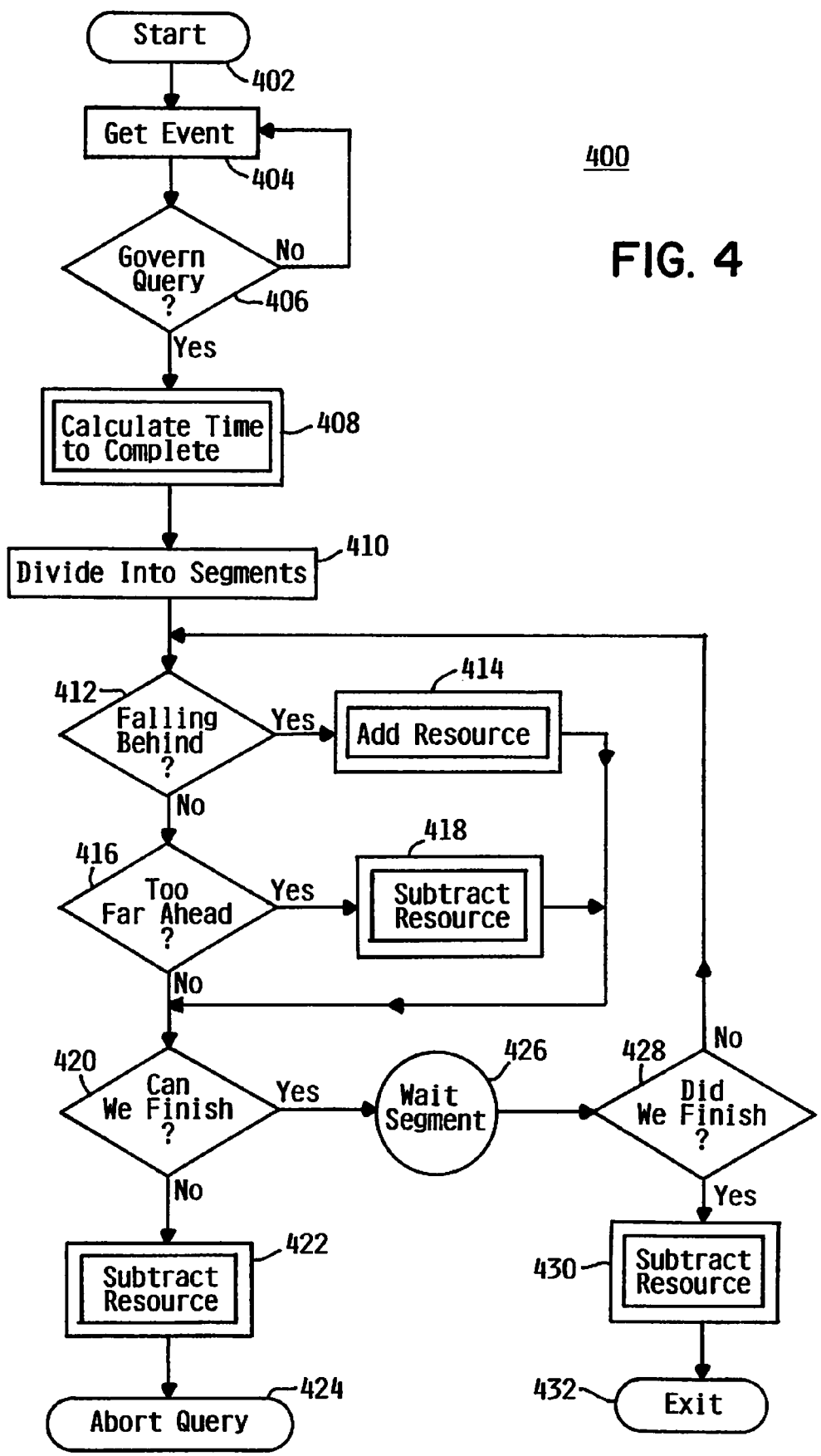
FIG. 4 is an exemplary flow diagram illustrating the dynamic prediction of computer resources to be applied to queries, according to one embodiment of the present invention.

Referring now to FIG. 4, there are illustrated exemplary steps of a query managing method 400 of the present invention that are implemented by the data processing system 100 including the query scheduling manager 146. Basically, the query managing method 400 dynamically allocates/de-allocates computer resources, appropriately, so that queries may run that were otherwise preempted from running due to their runtimes being predicted to be too long; as determined by the query governor. The query governor may be configured to have a threshold value or a limit which if the runtime of the query exceeds; the query will not be allowed to run. In addition, the query managing method 400 operates to apportion costs for computer resources that are actually utilized in accomplishing the tasks. The query managing method 400 starts in step 402. In a Get Event step 404, a query is an event forwarded from the query optimizer to the query governor and includes a time value that predicts a query run time (e.g., seconds) for the query. From the Get Event step 404, a query governor determination step 406 follows.

In the query governor determination step 406, a decision is made by the query governor whether the query's predicted runtime, as obtained by the query optimizer, will fit within predefined query time boundaries or not. These predefined boundaries may be set, for example, by a user through a graphical user interface (GUI) screen 800 (FIG. 8) as will be explained. If the decision in step 406 is No, that is a query is not going to exceed a predefined time boundary, then the query managing method 400 proceeds back to the Get Event step 404. Following this return, the query managing method 400 awaits for another query to evaluate. Alternatively, if the determination in the step 406 is Yes, that is indicative of query governor preemption due to the query's predicted runtime exceeding a predefined time boundary, then the calculate time to complete step 408 follows. Specifically, in the calculate time to complete step 408 an algorithm is applied that calculates a new query running time based on the allocation of resources to get the query to run faster. The new query running time may be selected so that the new query running time estimate does not exceed a predefined time boundary. Accordingly, the query would not be preempted by the query governor.

Figure 5:
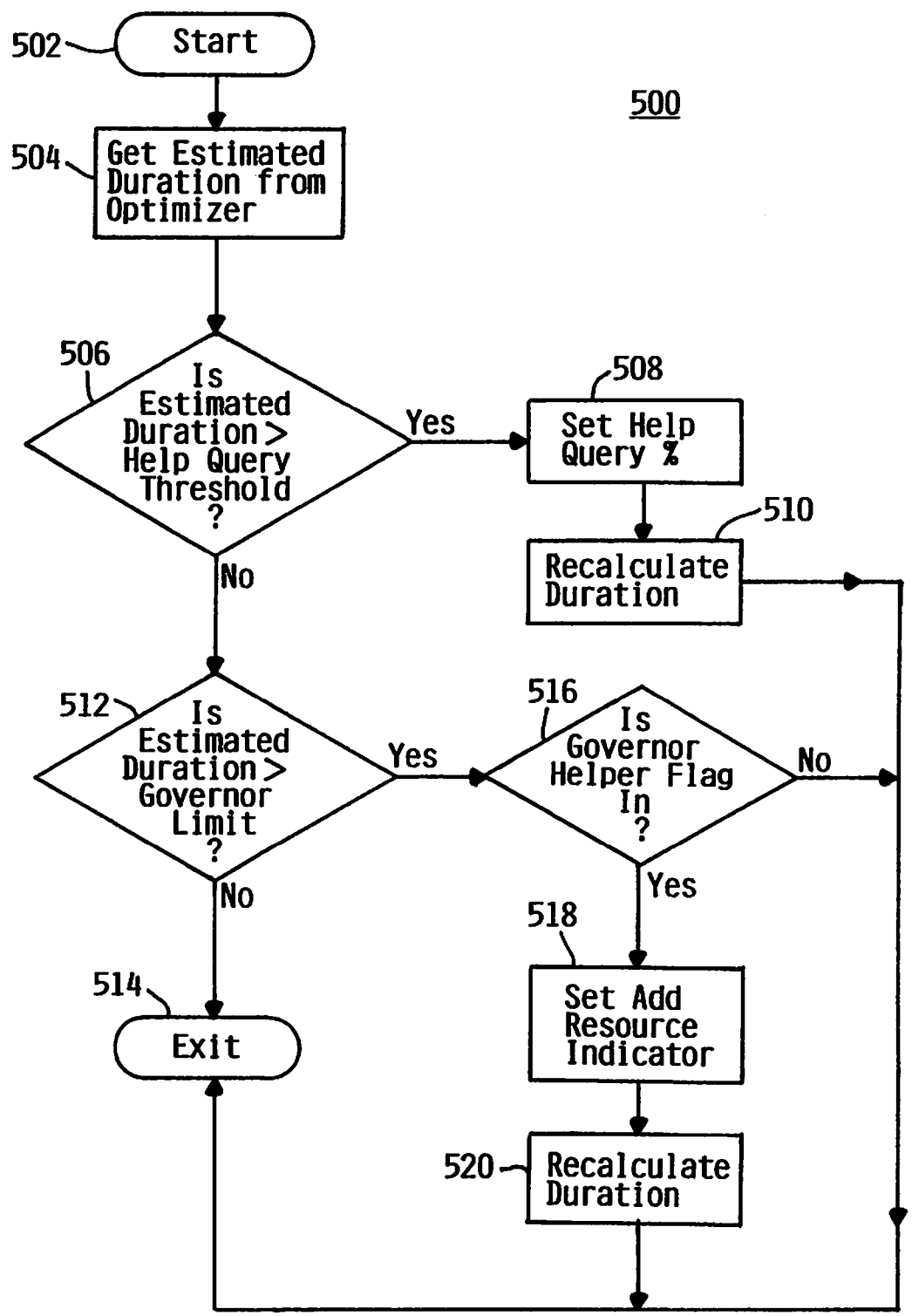
FIG. 5 is an exemplary flow diagram illustrating the allocation and de-allocation of resources to one embodiment of the present invention.
Figure 8:
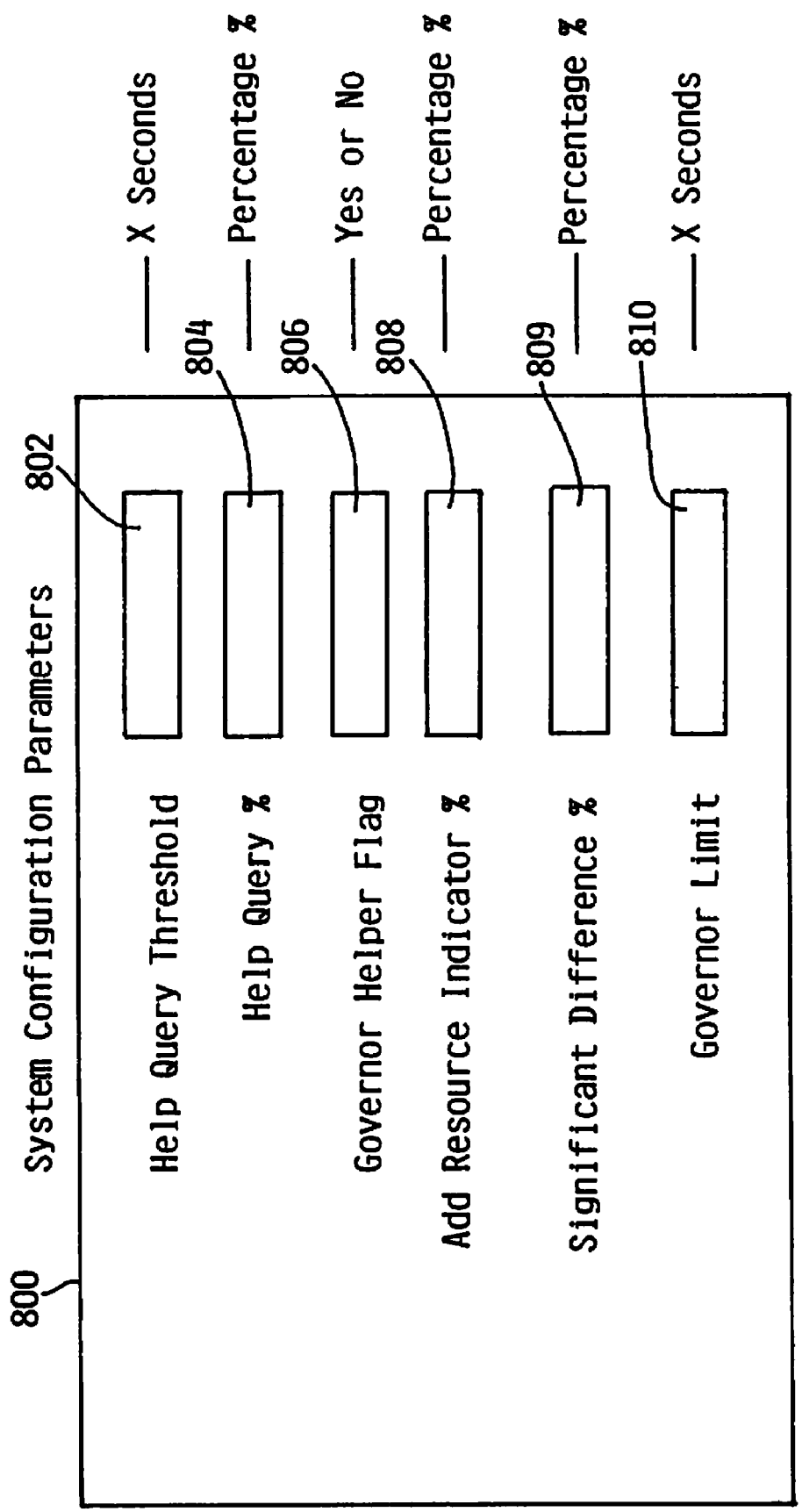
FIG. 8 is illustrative of a graphical user interface that is utilized for allowing a user to specify parameters for configuring system operations in order to meet the demands of customers.

In particular, reference is made to FIG. 5 for illustrating exemplary steps for accomplishing the task of calculating the new estimated query running time routine or method 500 that is performed in step 408. The query running time routine 500 may be performed by the scheduling module 146. These new estimates of query running time (e.g., seconds) are, preferably, indicative of the query running time getting faster and completing prior to the predefined time boundary being exceeded. For instance, the predefined time boundary may be ten (10) seconds as established by a user entering ten (10) seconds in the field 810 (FIG. 8). As a result, the query governor may only allow running of a query if the latter is estimated to finish in ten (10) seconds or less. As will be explained, the appropriate amounts of computer resources are dynamically allocated from other source(s) to assist in getting the query to finish in less than 10 seconds.

The query running time routine 500 starts in the step 502 whereat, the query's runtime estimate is obtained from step 504. Step 506 follows step 504. In step 506, a determination is made by the query governor as to whether or not the estimated duration of a query is greater than the time value, if any, entered by the system user in the Help Query Threshold field 802 (FIG. 8). By doing it this way, a user may set a predefined time boundary at which available resources will be sought for a query. The predefined time boundary value entered in the Help Query Threshold field 802 need not be coincidental with the query governor limit time boundary value that is entered in the field 810 (FIG. 8). It will be appreciated that when a user enters a value in the Help Query Threshold field 802, the user may enter a non-zero percentage value in the Help Query % field 804 (FIG. 8).

The value entered in the Help Query % field 804 is based on a determination by the system user as to the percentages of available resources that the user would want to apply to get the query to run faster. For example, if a query is estimated to take longer than the value entered in the Help Query Threshold field 802 (e.g., 5 seconds), a user may desire to provide additional resources (CPU) from another partition or the like in a suitable amount to make the query run faster. The amount of additional CPU added would be based on a percentage value entered in the Help Query % field 804. For example, the system user may want to help the query runtime by providing an increase of 20% of additional available resources. Additionally, the invention envisions having the query governor take resources from the available resources if and only if a significant difference in query execution time can be reached, such as a 50% improvement, as added by the user in field 809 (FIG. 8). For example, if a query is estimated to run in 5 seconds the system user might want additional resources so as to define a 50% improvement. Other percentage values may be entered. The present invention contemplates that the percentage value may be based on fees and/or the type of applications, systems or jobs, etc. that are running. Additional resources may be added based on predictions of additional bottlenecks predicted to occur by the query governor. Thus, delays in processing time will be a factor in estimating the amount of runtime estimated by the governor.

Referring back to step 506, if there is a Yes decision that a query's estimated runtime exceeds the value in the Help Query Threshold field 802, then a Set Help % step 508 follows. In step 508, a percentage value is entered by the user in Help Query % field 804. This value is utilized for determining the additional resources to make the query run faster. Specifically, an algorithm utilizes the value to define additional amounts of resources to be added to get the query runtime, preferably, within the predefined time boundary. The resources to be added are in predefined amounts for accomplishing the above task. The system itself may configure such values as well. Following the step 508, a query recalculate step 510 is performed in which a new estimated runtime for the query is utilized. In step 510, a new predicted runtime for the query is recalculated based on the increased amount of resources to be allocated. Thereafter, the query running time routine 500 proceeds to exit in step 514; whereupon the recalculated query runtime is to be utilized in step 410 as will be described.

Alternatively, if No is decided in step 506, then the step 512 follows. In step 512 a determination is made about whether the query runtime is greater than the predefined governor time limit set, preferably, by a user in field 810 of the GUI screen 800. In step 512, if a No decision is made, the routine exits as step 514 and then proceeds to step 410. Alternatively, if Yes in step 512, then step 516 follows. In step 516, a decision is made about whether a governor Help flag has been set. The Help flag is utilized if a system user is interested in getting help for a predicted long-running query. If No, a system user did not set a governor Help flag, then the routine 500 exits in step 514. If Yes, a system user did set a governor Help flag, as by setting an appropriate value in a field 804 in a GUI 800 in FIG. 8, the computer resources are to be added. In step 518, an algorithm establishes the amount of resources to be added, by preconfigured user selected parameters. This is done so as to avoid having the query governor prevent execution of the query. The preconfigured amounts to be added will result in the query runtime completing within the predefined time boundary. In step 520, a new query runtime will be recalculated. Thereafter, the routine 500 exits in step 514, whereupon the reconfigured runtime estimate will be utilized in step 410.

Returning to FIG. 4, in step 410 the new estimated query runtime will be divided into an appropriate amount of segments; much as indicated in copending and commonly assigned patent application. For example, the new query time is divided into several time segments and intervals (e.g., 4 segments). Each of the intervals is to be processed to determine if available computer resources are adequate or not to process the query. Thereafter, a falling behind decision is made in step 412. The decision is made as to whether available resources will result in a query run which falls behind schedule. This decision takes into account the added query runtime including any other demands (such as bottlenecks) being made on the computer system during processing of the query. If the decision in step 412 is Yes, that the process would fall behind, additional resources are added appropriately in step 414. Alternatively, if the decision in step 412 is No, then the Is Too Far Ahead decision step 416 follows.

Figure 6:
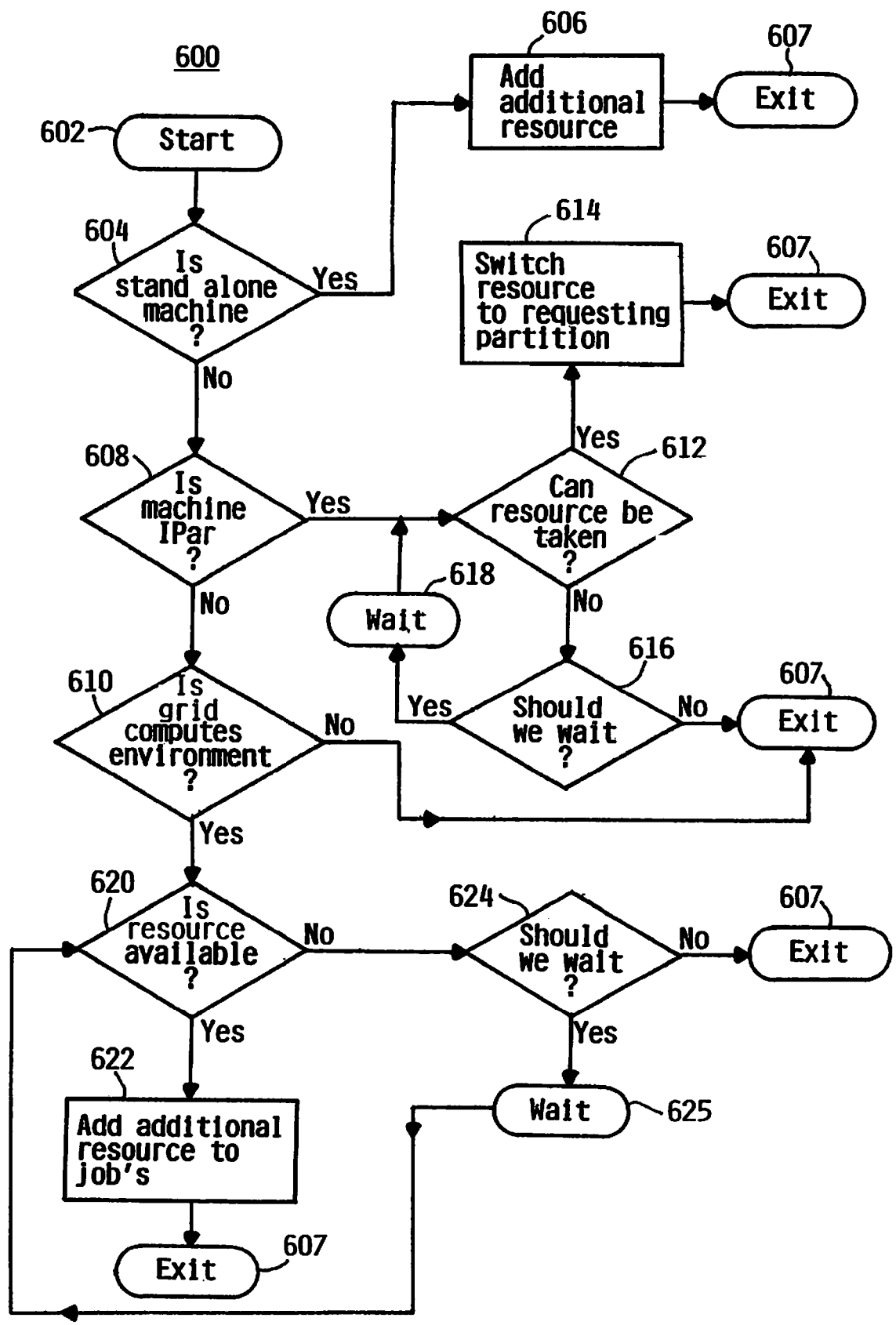
FIG. 6 is an exemplary flow diagram illustrating another aspect of the process being performed by the present invention.

Reference is made to FIG. 6 for illustrating a resource allocation method 600 for allocating appropriate resources that may occur in step 414. In operation of the resource allocation method 600, appropriate resources are added to the current process in order for the queries fit within predefined query time boundaries. In step 602, the adding resources process starts. In step 604, a determination is made as to whether the processing is being done on a stand-alone or unpartitioned computer system. If Yes, then step 606 follows. In step 606 an algorithm is applied to determine the amount of resources (e.g., extra CPU, memory) that should be allocated to reduce the query running time. Preferably, before the query will run, the amount of resources to be dynamically allocated is appropriate to speed up the query runtime. As such, the query is able to fit within the predefined time boundary. Following such allocation indication in step 606, then the routine 600 exits at step 607, whereupon the query managing method 400 continues. Alternatively, if No, then step 608 is performed.

In step 608 a decision is made as to whether the system is an LPAR system. If a Yes decision is made at step 608 then a Can Resources be Taken decision step 612 follows. In the Can Resources be Taken step 612, a determination is made as to whether or not partition(s) resources may be switched to the requesting partition to supply the resources that should be applied for getting the query to fit the time boundary. If a Yes decision is made in the Can Resources be Taken step 612, the resources may be switched in the Switch Resources to Requesting Partition step 614 by an appropriate amount. Following step 614, the process 600 then proceeds to exit step 607, whereupon method 400 resumes. Alternatively, if in the Can Resources be Taken step 612 a No or negative decision is made, then a Should We Wait step 616 is performed. In the Should We Wait step 616, a determination may be made as to whether the process should wait for a predefined period of time before requesting resources from other partition(s). If a decision is No in the Should We Wait step 616, then exit step 607 follows. Thereafter, the query managing method 400 resumes. Alternatively, if the decision is Yes in the Should We Wait step 616, then a Wait step 618 is performed. In the Wait step 618, a predetermined amount of time is allowed to elapse before sending the query resource request to the Can Resources be Taken step 612. The time period of the waiting and the number of waiting cycles may be configured by the system. Alternatively, if a No determination is decided, then a Grid Compute decision is made in step 610. In the Grid Compute decision step 610, a determination is made as to whether or not the system is in a grid computing environment. If the decision in step 610 is Yes, then the Is Resource Available decision step 620 is performed. In step 620, if the decision is Yes, then the Add additional resources step 622 is performed, and exits in step 607. If the decision in the Is Resource Available decision step 620 is No, then the Should We Wait step 624 is performed. If the decision in the Should We Wait step 624 is No then the process exits in step 607. If the decision in the Should We Wait step 624 is Yes then the Wait step 625 is performed, whereby the process proceeds after a predefined time back to the Is Resources Available step 620. If after a predetermined time no resources are available then step 607 follows and the query managing method 400 resumes in step 420.

As noted if the decision in the step 412 is negative, then the Is Too Far Ahead step 416 performed. If the decision in step 416 is No then step 420 follows. If the decision in step 416 is Yes, then the Subtract Resources step 418 follows.

Figure 7:
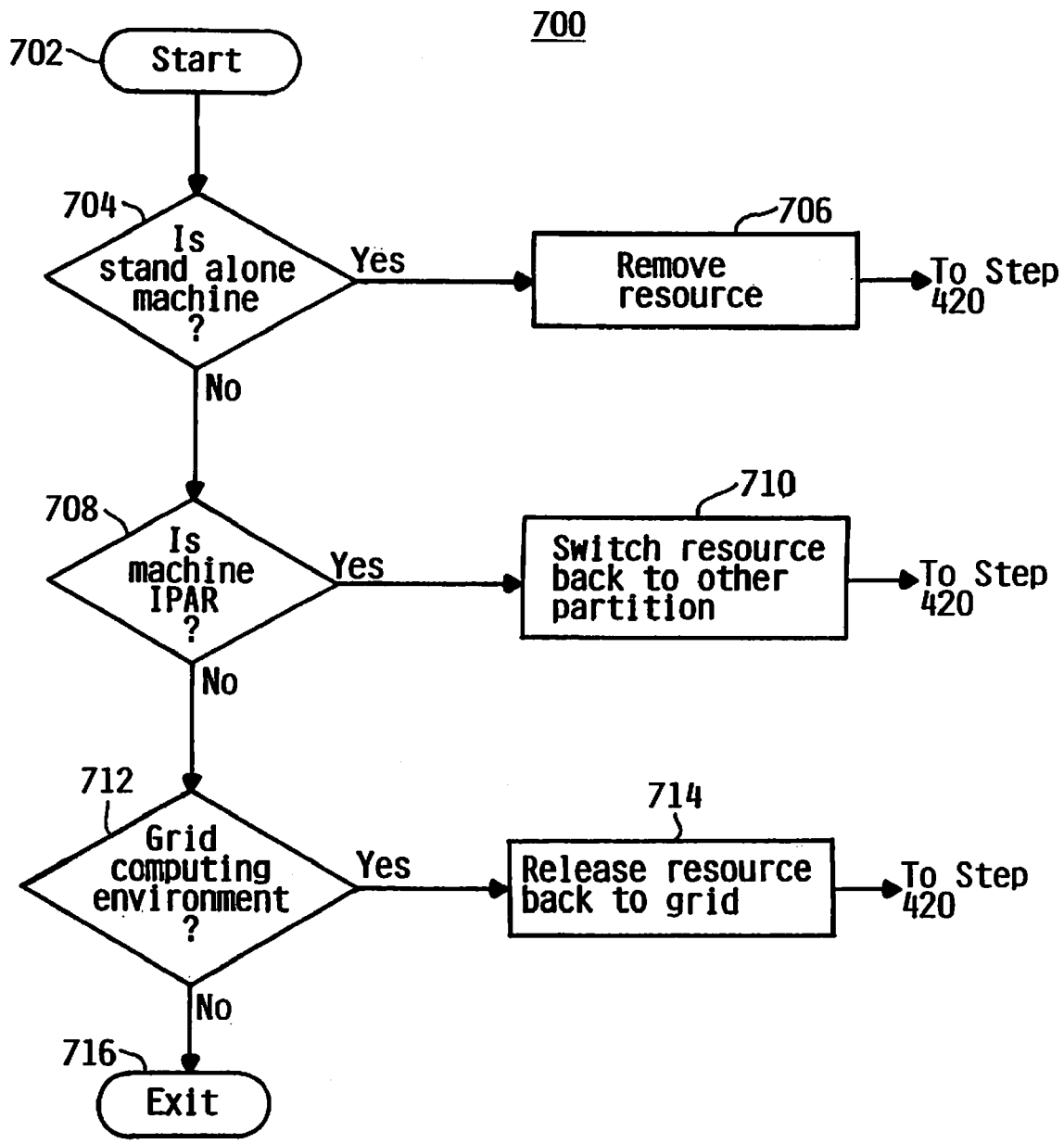
FIG. 7 is an exemplary flow diagram illustrating another aspect of the process being performed by the present invention.

Reference is made to FIG. 7 for illustrating a resource removal method 700 for allocating appropriate resources that is to occur in step 418. In operation of the method 700, appropriate resources are added to the current process in order for the queries to finish at or in close proximity to the predefined query window. The resource removal process 700 starts in step 702. In step 704, a determination is made as to whether the processing being performed is on a stand-alone or unpartitioned computer system or not. If Yes, then in step 706 an algorithm is applied to determine the amount of computer resources that may be de-allocated or removed without impacting negatively on the queries finishing its runtime at or in close proximity to the predefined query window. Specifically in step 706, it is determined if an appropriate amount of computer resources, such as CPU, may be de-allocated. The data from step 706 is forwarded to step 422.

Alternatively, if No is determined in step 704, then step 708 may be performed in which it is determined if the machine that is running is a logically partitioned computer system. If in step 708, No is determined, step 712 may be performed. In step 708, a determination is made whether or not the computer system being utilized is logically partitioned or not. If No, then step 712 is performed. Alternatively, if Yes is decided in step 708, then step 710 is performed. In step 710, the partition manager 240 is notified as to which appropriate resources may be shifted to other partitions from the partition performing the current query process. Such shifting is based on appropriate input. If No was determined in step 708, then step 712 is performed. In step 712, a determination is made as to whether the grid computing environment 104 is coupled to the computer system 100. If in step 712, the decision is No, then the process 700 proceeds to step 716. Alternatively, if the decision is Yes, then step 714 is performed in which data regarding the appropriate amount of resources is forwarded to the grid control. The grid control is operative for shifting such resources back to the grid environment 104 from the computer system 100.

Reference is made back to FIG. 4 for a continuation of the method. In a Can We finish step 420, a decision is made as to whether or not the recalculated query runtime may finish within the predefined time period given the available resources present at the moment. If the decision in step 420 is No, then the resources that were to be dynamically allocated earlier are to be withdrawn or subtracted from the Subtract Resource step 422. Thereafter, the query is aborted in step 424 by the query governor. Alternatively, if the decision in the Can We Finish step 420 for the particular time segment or interval is Yes, then a Wait step 426 is performed for a predefined period of time. The wait is for all the segments created in the Divide into Segments step 410 to complete. After the Wait step 426, then the Did We Finish decision step 428 is performed. In the Did We Finish decision step 428, a determination is made as to whether the new query estimate is finished within the predefined query time boundary or runtime. If No, then the process loops back to step 412 for a repetition of the process. Alternatively, if Yes is the decision in the Did We Finish decision step 428, then additional resources not needed are removed or subtracted in the Subtract Resources step 430. Following the Subtract Resources step 430, the query managing method 400 terminates or exits in step 432.

FIG. 8 illustrates a graphical user interface (GUI) configuration screen 800 for allowing a system user to configure parameters that are utilized in the performance of the steps of the present invention. In this regard, a field 802 is provided in which values are input for parameters that control the Help query threshold. The Help query threshold may include values of time (e.g., seconds) which define a threshold value which if exceeded by the query running would cause the query governor to preempt running of the query. Field 804 is useful in terms of having the system user selecting increases in computer resources utilized in the query run that will improve query time performance so as to fit the query within the predefined time boundary. For example, these values may relate to percentage increases (10%, 20%, of etc.) of computer resources. Field 806 is useful in terms of having a user set a governor Helper flag. If the flag is set in the field 806, the query scheduling manager 146 will allow the query governor to operate so as to allocate resources in relation to having the query run within the predefined time boundary. This will occur if the query's run is predicted to exceed the query governor time limit. In regard to the latter, a user may identify the maximum governor time limit for query runs in field 810 in terms of a time unit (e.g., seconds). The field 808 allows user input of added computer resources that will prevent a query from timing out. The amount of additional computer resources may be based on providing known percentages increases of computer resources, such as preselected percentage increases (e.g., 10%, 20%, etc.). Other algorithms may be utilized in terms increasing computer resources.

At this point, while the present invention has been described in the context of a fully functional computer system, those skilled in the art will appreciate that the present invention is capable of being distributed as a program product. The present invention applies equally as well regardless of the particular type of computer readable signal bearing media utilized to actually carry out the distribution.

One aspect of the invention is implemented as a program product for use with a computer system or environment. The program(s) of the program product defines functions of the embodiments (including the methods described herein) and may be contained on a variety of signal-bearing media. Illustrative signal-bearing media include, but are not limited to: (i) information permanently stored on non-writable storage media (e.g., read-only memory devices generally within a computer such as CD-ROM disks readable by a CD-ROM drive); (ii) alterable information stored on writable storage media (e.g., floppy disks generally within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions.

At this point, while the present invention has been described in the context of a fully functional computer system, those skilled in the art will appreciate that the present invention is capable of being distributed as a program product. The present invention applies equally as well regardless of the particular type of computer readable signal bearing media utilized to actually carry out the distribution.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature utilized is merely for convenience. Thus, the invention should not be limited to use solely in any specific application identified and/or implied by such nomenclature.

The embodiments and examples set forth herein were presented to explain best the present invention and its practical applications, thereby enabling those skilled in the art to make and use the invention. However, those skilled in the art will recognize that the foregoing description and examples have been presented for the purposes of illustration and example only. The description set forth is not intended to be exhaustive or to limit the invention to the precise forms disclosed. In describing the above-exemplary embodiments illustrated in the drawings, specific terminology has been utilized for the sake of clarity. However, the invention is not intended to be limited to the specific terms selected. It is to be understood that each specific term includes all technical equivalents that operate in a similar manner to accomplish a similar purpose. Many modifications and variations are possible in light of the above teachings without departing from the spirit and scope of the appended claims.

What is claimed is:

1. A system comprising:
one or more processors;
a memory coupled to at least the one processor; and,
a manager residing in the memory and executable by the at least one processor, wherein said manager:
(a) evaluates a runtime instance of a query during execution of said runtime instance for data relative to performance of said runtime instance with respect to a predefined query time boundary, said data relative to performance of said runtime instance with respect to a predefined query time boundary being derived from execution of said runtime instance, said predefined query time boundary limiting a length of time in which said runtime instance of said query is allowed to complete runtime execution;
(b) dynamically predicts, during execution of said runtime instance and using said data relative to performance of said runtime instance, a projected amount of computer resources required to complete execution of said runtime instance of said query within said predefined query time boundary; and
(c) uses the results of said dynamically predicting step to dynamically allocate an amount of computer resources to complete execution of said runtime instance of said query, said amount being an amount required to make the total amount of said computer resources allocated to complete execution of said runtime instance of said query equal to said projected amount of computer resources required to complete execution of said runtime instance of said query within said predefined query time boundary dynamically predicted by said dynamically predicting step.

2. The system recited in claim 1, wherein dynamic predicting includes the manager evaluating the query and the available computer resources to be allocated so that said runtime instance of said query executes within the predefined query time boundaries.

3. The system recited in claim 1, wherein the manager stops running of the query during running if the query runtime exceeds the predefined query time boundary.

4. The system recited in claim 1, wherein the manager renders costs for computer resources actually utilized in having execution of said runtime instance of said query complete within the predefined query time boundary.

5. The system recited in claim 1, wherein the manager further allocates/de-allocates resources that are provided by a networked computing grid and/or one or more processor partitions of the at least one processor.

6. The system recited in claim 1, further comprising a user interface that allows a user establishing parameter values for the predicted allocation of the computer resources.

7. The system recited in claim 1, wherein the manager increases the allocated resources by predefined levels of increases in accordance with a user policy.

8. A computer-implemented method in a system having at least one processor; a memory coupled to the at least one processor, and a manager residing in the memory and being executable, the method comprising:
evaluating a runtime instance of a query during execution of said runtime instance for data relative to performance of said runtime instance with respect to a predefined query time boundary, said data relative to performance of said runtime instance with respect to a predefined query time boundary being derived from execution of said runtime instance, said predefined query time boundary limiting a length of time in which said runtime instance of said query is allowed to complete runtime execution;
dynamically predicting, during execution of said runtime instance and using said data relative to performance of said runtime instance, a projected amount of computer resources required to complete execution of said runtime instance of said query within said predefined query time boundary; and
responsive to said dynamically predicting step, dynamically allocating an amount of computer resources to complete execution of said runtime instance of said query, said amount being an amount required to make the total amount of said computer resources allocated to complete execution of said runtime instance of said query equal to said projected amount of computer resources required to complete execution of said runtime instance of said query within the predefined query time boundary dynamically predicted by said dynamically predicting step.

9. The method recited in claim 8, wherein dynamic predicting includes evaluating the query and the available computer resources.

10. The method recited in claim 8, further comprising rendering costs to a customer for computer resources actually utilized in having execution of said runtime instance of said query complete within the predefined query time boundary.

11. The method recited in claim 8, wherein the allocating of resources is provided by a networked computing grid and/or one or more processor partitions of the at least one processor.

12. The method recited in claim 8, further comprising allowing the utilization of a user interface for establishing parameter values for additional computer resources based on computer costs.

13. The method recited in claim 8, wherein the computer resources that are allocated are appropriately increased by predefined levels.

14. The method recited in claim 8, wherein the query is prevented from running if the actual query running time exceeds the predefined query time boundary.

15. A computer program product for implementing query optimization in a computer system including a processor, said computer program product including instructions recorded on computer-readable recording media which when executed comprise the steps of:
evaluating a runtime instance of a query during execution of said runtime instance for data relative to performance of said runtime instance with respect to a predefined query time boundary, said data relative to performance of said runtime instance with respect to a predefined query time boundary being derived from execution of said runtime instance, said predefined query time boundary limiting a length of time in which said runtime instance of said query is allowed to complete runtime execution;
dynamically predicting, during execution of said runtime instance and using said data relative to performance of said runtime instance, a projected amount of computer resources required to complete execution of said runtime instance of said query within said predefined query time boundary; and responsive to said dynamically predicting step, dynamically allocating an amount of computer resources to complete execution of said runtime instance of said query, said amount being an amount required to make the total amount of said computer resources allocated to complete execution of said runtime instance of said query equal to said projected amount of computer resources required to complete execution of said runtime instance of said query within the predefined query time boundary dynamically predicted by said dynamically predicting step.

16. The computer program product recited by claim 15, further comprising rendering costs to a customer for computer resources actually utilized in having execution of said runtime instance of said query complete within the predefined query time boundary.

17. The computer program product recited by claim 15, wherein the allocating of computer resources is from a networked computing grid and/or one or more additional processor partitions of the at least one processor, and any combination thereof.

18. The computer program product recited by claim 15, further comprising allowing the utilization of a graphical user interface for allowing a user to establish parameter values related to the costs of utilizing computer resources for having execution of said runtime instance of said query complete within the predefined query time boundary.

* * * * *